United States Patent
Murayama (10) Patent No.: US 10,553,888 B2
(45) Date of Patent: Feb. 4, 2020

(54) FUEL CELL AND ABNORMALITY DETERMINATION METHOD

(71) Applicant: BROTHER KOGYO KABUSHIKI KAISHA, Nagoya-shi, Aichi (JP)

(72) Inventor: Kentaro Murayama, Nagoya (JP)

(73) Assignee: BROTHER KOGYO KABUSHIKI KAISHA, Nagoya-shi (JP)

( * ) Notice: Subject to any disclaimer, the term of this patent is extended or adjusted under 35 U.S.C. 154(b) by 540 days.

(21) Appl. No.: 15/045,987

(22) Filed: Feb. 17, 2016

(65) Prior Publication Data

US 2016/0276684 A1    Sep. 22, 2016

(30) Foreign Application Priority Data

Mar. 17, 2015 (JP) ................. 2015-053885

(51) Int. Cl.
  *H01M 8/04992* (2016.01)
  *H01M 8/04492* (2016.01)
  *H01M 8/04119* (2016.01)

(52) U.S. Cl.
  CPC ... *H01M 8/04992* (2013.01); *H01M 8/04164* (2013.01); *H01M 8/04492* (2013.01)

(58) Field of Classification Search
  CPC ......... H01M 8/04992; H01M 8/04164; H01M 8/04492; H01M 8/04679
  See application file for complete search history.

(56) References Cited

U.S. PATENT DOCUMENTS

2007/0196709 A1    8/2007    Umayahara et al.

FOREIGN PATENT DOCUMENTS

| JP | 2005050554 A | 2/2005 |
|---|---|---|
| JP | 2005-302708 A | 10/2005 |
| JP | 2008041346 A | 2/2008 |
| JP | 2009152092 A | 7/2009 |

OTHER PUBLICATIONS

English translation of Box No. V 2. of Written Opinion of the International Searching Authority of PCT/JP2015/79500 dated Jan. 19, 2016.

*Primary Examiner* — Helen Oi K Conley
(74) *Attorney, Agent, or Firm* — K&L Gates LLP

(57) ABSTRACT

An example fuel cell comprises: a gas-liquid separator separately storing gas and water; a discharge valve discharging the gas and the water; a control unit controlling the operation of the discharge valve; and a detector detecting a water level of the gas-liquid separator. The control unit is configured to determine an abnormality of the discharge valve based on a change in water level caused by opening and closing of the discharge valve if the water level detected by the detector is equal to or higher than a first threshold.

5 Claims, 7 Drawing Sheets

FUEL CELL AND ABNORMALITY DETERMINATION METHOD

CROSS-REFERENCE TO RELATED APPLICATIONS

This non-provisional application claims priority under 35 U.S.C. § 119(a) on Patent Application No. 2015-053885 filed in Japan on Mar. 17, 2015, the entire contents of which are hereby incorporated by reference.

FIELD

The technology herein relates to a fuel cell and an abnormality determination method.

BACKGROUND AND SUMMARY

In recent years, a fuel cell has been used in a computer, a mobile phone, an automobile or the like. The fuel cell includes a stack which is obtained by stacking cells generating electric power by gas supplied from the outside. The cell includes electrolyte as well as a cathode and an anode facing each other through the electrolyte. The cell generates electric power by an electrical chemical reaction occurring when oxidation gas including oxygen such as air is supplied to a cathode and fuel gas including hydrogen is supplied to an anode.

In the anode, hydrogen is changed into hydrogen ions by a catalyst and hence electrons are generated. In order to reduce the wasted hydrogen in the fuel cell, fuel gas including unreacted hydrogen is circulated so as to be supplied to the anode again. In the cathode, water is produced by the reaction of the oxygen of the oxidation gas and the hydrogen ions passing through the electrolyte. The produced water is discharged to the outside of the fuel cell along with the unreacted oxidation gas.

Here, a part of the water produced in the cathode passes through the electrolyte inside the cell to move toward the anode, and is circulated inside the fuel cell along with the unreacted fuel gas to stay therein. The staying water disturbs the supply of hydrogen to the anode. Further, when air is used as the oxidation gas, a part of nitrogen in the air passes through the electrolyte to move toward the anode. The nitrogen moving toward the anode is circulated inside the fuel cell along with the fuel gas including unreacted hydrogen. An increase in nitrogen concentration inside the fuel cell causes a decrease in hydrogen concentration, and hence the performance of the cell is degraded.

Accordingly, in order to discharge the water and the nitrogen, the fuel cell includes a gas-liquid separator which is provided in a circulation line and a discharge valve which is connected to the gas-liquid separator. The gas-liquid separator separately stores the water and the gas therein. The water which is produced by the generation of electric power and stays inside the fuel cell is stored inside the gas-liquid separator by a predetermined amount and is discharged to the outside. Further, the nitrogen is discharged at the same time in such a manner that the discharge valve discharges a predetermined amount of the gas inside the gas-liquid separator after the water is discharged. The fuel cell discharges a desired amount of water and fuel gas by controlling the operation of the discharge valve.

When an abnormality such as a failure or a problem occurs in the discharge valve, there is a concern that the water and the gas inside the gas-liquid separator are not discharged and the performance of the fuel cell is degraded.

Accordingly, there is a case where the fuel cell determines the abnormality of the discharge valve of the fuel cell. An example of the fuel cell includes two discharge valves connected in series to the gas-liquid separator. In the fuel cell, the abnormality of the opening and closing operations of two discharge valves is determined in such a manner that the operation time points of two discharge valves are set to be different in the gas discharge state and a pressure change between two discharge valves in the gas leakage state is detected by a pressure sensor.

However, in the fuel cell, since the abnormality of the opening and closing operations of the discharge valve is determined by a change in pressure caused by the leakage of the gas, a problem arises in that the fuel gas is uselessly discharged.

In consideration of the above-described circumstances, it is an object to provide an example embodiment of a fuel cell capable of determining the abnormality of a discharge valve without discharging gas inside a gas-liquid separator and an abnormality determination method.

According to one aspect of the example embodiment, the fuel cell includes a gas-liquid separator separately storing gas and water; a discharge valve discharging the gas and the water; a control unit controlling the operation of the discharge valve; and a detector detecting a water level of the gas-liquid separator. The control unit is configured to determine an abnormality of the discharge valve based on a change in the water level caused by opening and closing of the discharge valve if the water level detected by the detector is equal to or higher than a first threshold.

According to one aspect of the example embodiment, the fuel cell includes a gas-liquid separator separately storing gas and water; a plurality of discharge valves discharging the gas and the water; a control unit controlling the operation of the discharge valves; a detector detecting a water level of the gas-liquid separator; and a clocking unit measuring an elapsed time from a time point when the gas and the water are discharged. The control unit is configured to determine an abnormality of the discharge valves if the detector detects a water level of a threshold or less after the clocking unit measures a predetermined time.

According to one aspect of the example embodiment, the abnormality determination method for determining an abnormality of a discharge valve of a fuel cell including a gas-liquid separator separately storing gas and water, a detector detecting a water level of the gas-liquid separator, a plurality of discharge valves disposed in series to discharge the gas and the water, and a control unit controlling operations of the discharge valves, comprises: determining whether the water level detected by the detector is equal to or higher than a threshold; and determining an abnormality of the discharge valves based on a change in the water level caused by an operation where the control unit opens and closes the discharge valves if determining the water level detected by the detector is equal to or higher than the threshold.

According to the example embodiment, it is possible to determine the abnormality of the discharge valve without discharging the gas inside the gas-liquid separator.

The above and further objects and features will more fully be apparent from the following detailed description with reference to the accompanying drawings.

DETAILED DESCRIPTION OF NON-LIMITING EXAMPLE EMBODIMENTS

Hereinafter, the example embodiments will be described with reference to the drawings.

(Embodiment 1)

Figure 1:
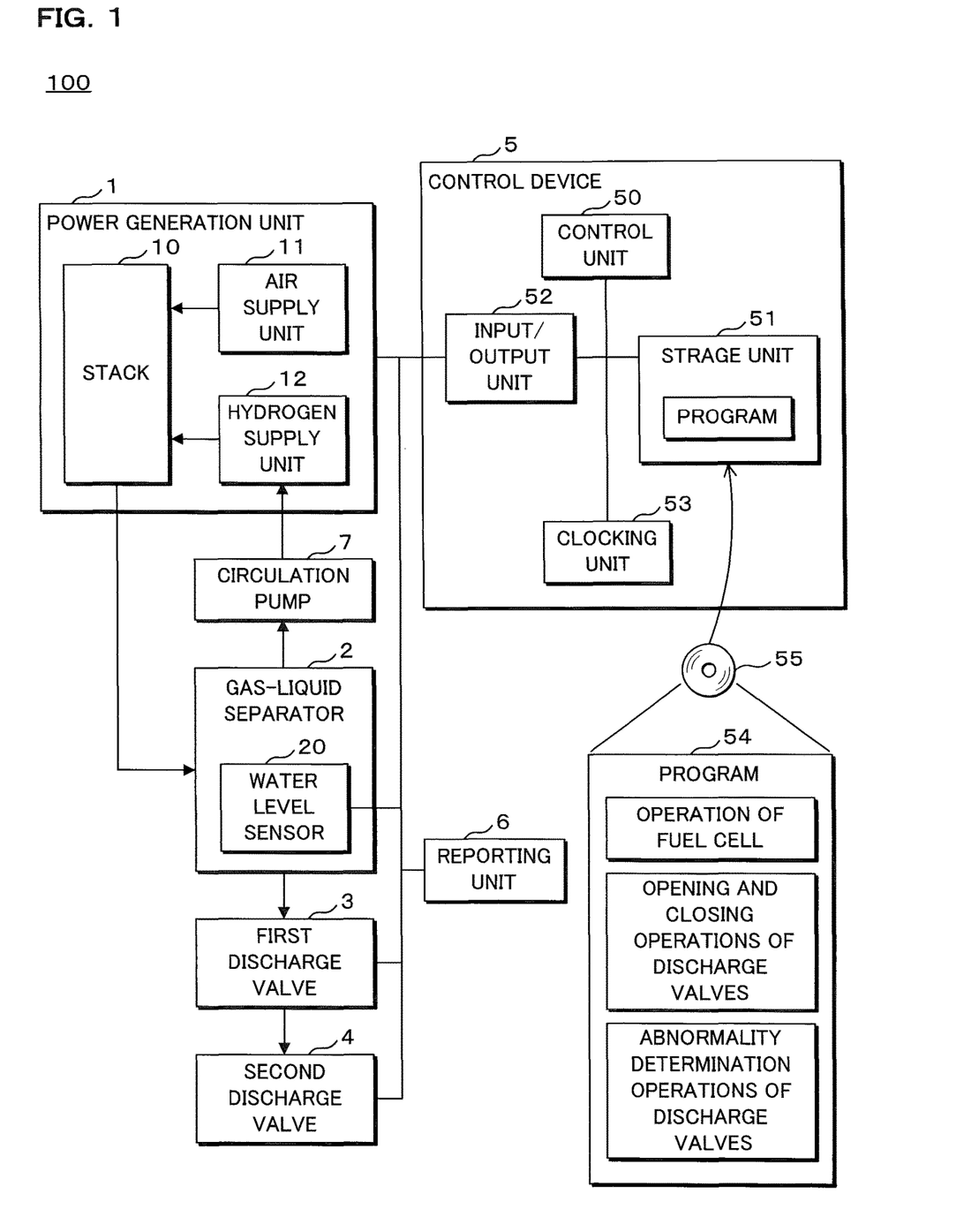
FIG. 1 is a block diagram illustrating the configuration of an example of non-limiting fuel cell according to Embodiment 1.

FIG. 1 is a block diagram illustrating the configuration of an example of non-limiting fuel cell according to Embodiment 1. A fuel cell 100 is illustrated in FIG. 1, and the fuel cell 100 includes a power generation unit 1, a gas-liquid separator 2 connected to the power generation unit 1, and a first discharge valve 3 and a second discharge valve 4 connected in series to the gas-liquid separator 2. Further, the fuel cell 100 includes a control device 5 which controls the power generation operation of the power generation unit 1 and the operations of the first discharge valve 3 and the second discharge valve 4, and a reporting unit 6 which reports the fuel cell state to the outside.

The power generation unit 1 includes a stack 10 in which a cell (not illustrated) having a cathode and an anode facing each other through an electrolyte membrane is stacked and an air supply unit 11 and a hydrogen supply unit 12 which are connected to the stack 10. The air supply unit 11 supplies air as oxidation gas including oxygen to the cathode of the cell, and the hydrogen supply unit 12 supplies fuel gas including hydrogen to the anode of the cell.

The gas-liquid separator 2 is connected to the stack 10 of the power generation unit 1. Unreacted fuel gas as well as gas including water and nitrogen as impurities are sent from the stack 10 to the gas-liquid separator 2. The gas-liquid separator 2 separates the water and the gas therein and stores the water and the gas. The gas-liquid separator 2 is equipped with a water level sensor 20 which detects the water level of the water stored therein.

A circulation pump 7 is connected to the gas-liquid separator 2, and the circulation pump 7 is connected to the hydrogen supply unit 12. By the circulation pump 7, the gas inside the gas-liquid separator 2 is supplied to the stack 10 through the hydrogen supply unit 12.

The first discharge valve 3 and the second discharge valve 4 are electromagnetic valves. Here, the electromagnetic valves are opened when electric power is supplied thereto and are closed when electric power supplied thereto is interrupted. When the first discharge valve 3 and the second discharge valve 4 are opened, the water and the gas inside the gas-liquid separator 2 are discharged. Regarding the discharge of the water and the gas, the gas is discharged after the discharge of the water. In addition, the first discharge valve 3 and the second discharge valve 4 may be electromagnetic valves which are closed when electric power is supplied thereto and are opened when electric power supplied thereto is interrupted.

The control device 5 includes a control unit 50 having a CPU (Central Processing Unit), a storage unit 51 having a nonvolatile memory such as a ROM (Read Only Memory) and a volatile memory such as a RAM (Random Access Memory), an input/output unit 52, and a clocking unit 53. The control device 5 is, for example, an ECU (Engine Control Unit) or a personal computer.

The storage unit 51 stores a program 54 causing a computer to perform the operation of the fuel cell 100, the opening and closing operations of the first discharge valve 3 and the second discharge valve 4, and the abnormality determination operations of the first discharge valve 3 and the second discharge valve 4. In addition, the operation of the fuel cell 100, the opening and closing operations of the first discharge valve 3 and the second discharge valve 4, and the abnormality determination operations of the first discharge valve 3 and the second discharge valve 4 may be performed by different programs instead of a single program.

The program 54 is stored in a recording medium 55 such as a CD (Compact Disc)-ROM, a DVD (Digital Versatile Disc)-ROM, a BD (Blu-ray (registered trademark) Disc), a hard disc drive, or a solid state drive which corresponds to a portable medium as a computer readable medium. Further, the control unit 50 reads out the program 54 from the recording medium 55 and stores the program 54 in the storage unit 51.

Further, the program 54 may be acquired from an external computer (not illustrated) connected to a communication network, and may be stored in the storage unit 51.

Further, the storage unit 51 temporarily stores the program 54 which is read out from the storage unit 51 during the calculation processing of the control unit 50 and various data produced by the calculation processing of the control unit 50.

The input/output unit 52 is connected to the power generation unit 1, the water level sensor 20, the first discharge valve 3, the second discharge valve 4 and the reporting unit 6. Further, the clocking unit 53 serves as a clock and a timer.

An instruction which is created by the control unit 50 is output to the power generation unit 1, the first discharge valve 3 and the second discharge valve 4 via the input/output unit 52. The water level detected by the water level sensor 20 is input to the control unit 50 via the input/output unit 52.

The reporting unit 6 is a liquid crystal display, an LED light or the like, but may be configured as any member as long as the abnormality of the fuel cell 100 can be reported to the outside.

Hereinafter, the operation of the fuel cell 100 will be described. The control unit 50 reads out the program 54 stored in the storage unit 51 and operates the fuel cell 100. The control unit 50 outputs a power generation instruction to the power generation unit 1. The power generation unit 1 which receives the instruction supplies air from the air supply unit 11 to the cathode of the cell in the stack 10, and supplies fuel gas from the hydrogen supply unit 12 to the anode of the cell in the stack 10. Thus, power is generated by an electrical chemical reaction generated in the cell inside the stack 10.

During the power generation operation by the power generation unit 1, unreacted fuel gas is sent to the gas-liquid separator 2. Further, water and nitrogen as impurities passing through electrolyte from the cathode and mixed with the fuel gas are also sent to the gas-liquid separator 2. The gas-liquid separator 2 separates the water from the mixed gas of the fuel gas and the nitrogen, and stores the separated product.

The gas which is stored in the gas-liquid separator 2 is sent to the hydrogen supply unit 12 through the circulation pump 7 and is supplied to the stack 10 again. Thus, the fuel cell 100 generates electric power without wasting the fuel gas including unreacted hydrogen.

When electric power is generated for a predetermined time or more, a predetermined amount of water is stored in the gas-liquid separator 2. Further, the concentration of nitrogen of the gas stored inside the gas-liquid separator 2 increases. Accordingly, in order to maintain the performance of the fuel cell 100, the fuel cell 100 discharges the water and the gas inside the gas-liquid separator 2.

The storage unit 51 stores a first threshold for the water level inside the gas-liquid separator 2. The control unit 50 opens the first discharge valve 3 and the second discharge valve 4 if the water level detected by the water level sensor 20 is equal to or higher than the first threshold.

When the first discharge valve 3 and the second discharge valve 4 are opened, the water and the gas stored inside the gas-liquid separator 2 are sequentially discharged. Thus, the water and the gas are discharged to the outside of the fuel cell 100.

Further, the fuel cell 100 is not limited to a structure directly discharging the water and the gas, but may be a structure in which the water and the gas are temporarily stored in a drainage tank and then are discharged to the outside. Further, the fuel cell 100 may have a structure in which a gas reformer is used in the hydrogen supply unit 12, and gas discharged from the inside of the gas-liquid separator 2 may be reused as the fuel of the gas reformer.

As described above, the fuel cell 100 generates electric power and maintains the power generation performance by discharging impurities. However, when the first discharge valve 3 and the second discharge valve 4 cannot be opened in the event of abnormality, impurities cannot be discharged and the power generation performance cannot be maintained. Accordingly, the control unit 50 determines the abnormality of the first discharge valve 3 and the second discharge valve 4.

Figure 2:
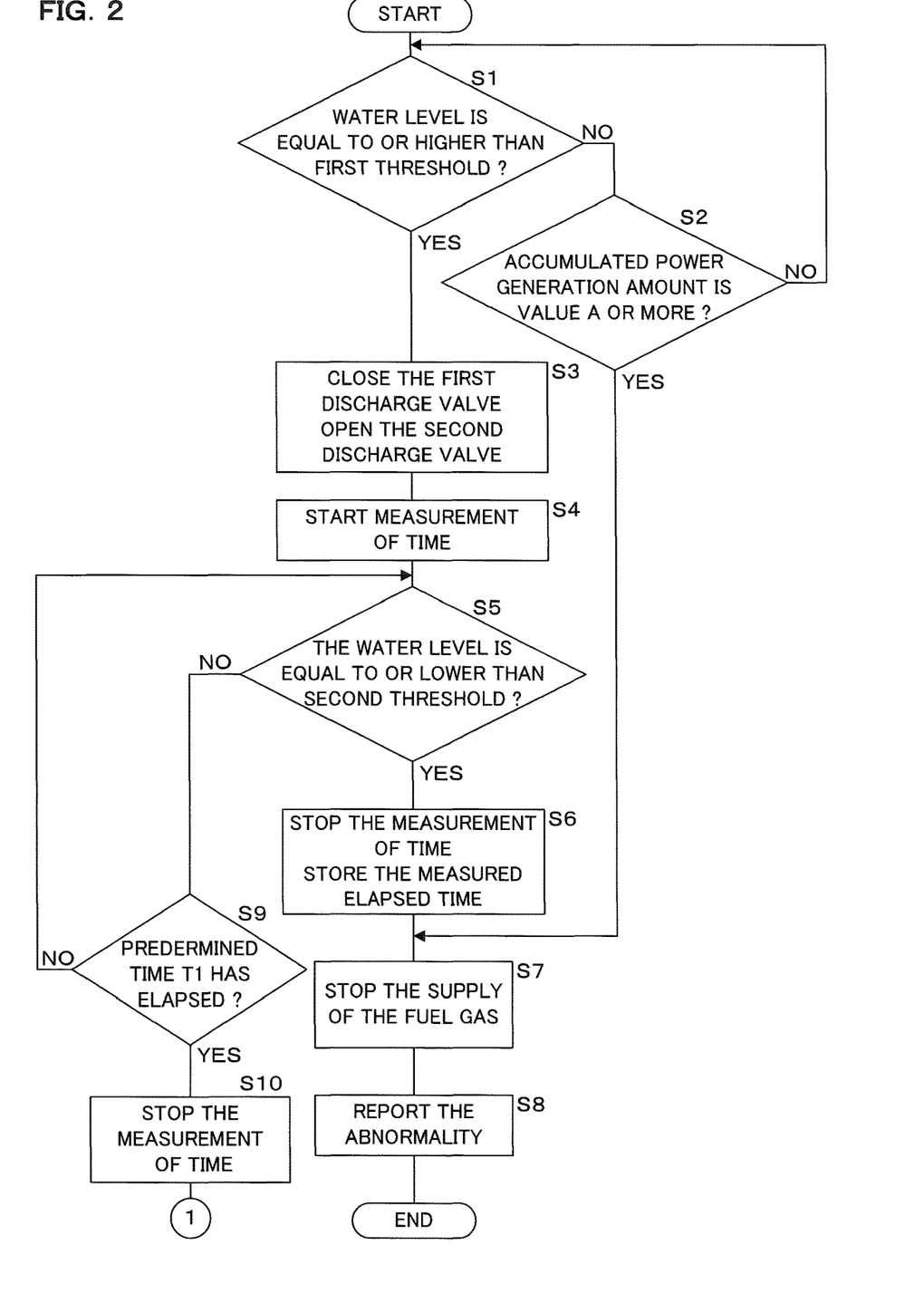
FIG. 2 is a flowchart illustrating a discharge valve abnormality determination procedure.
Figure 3:
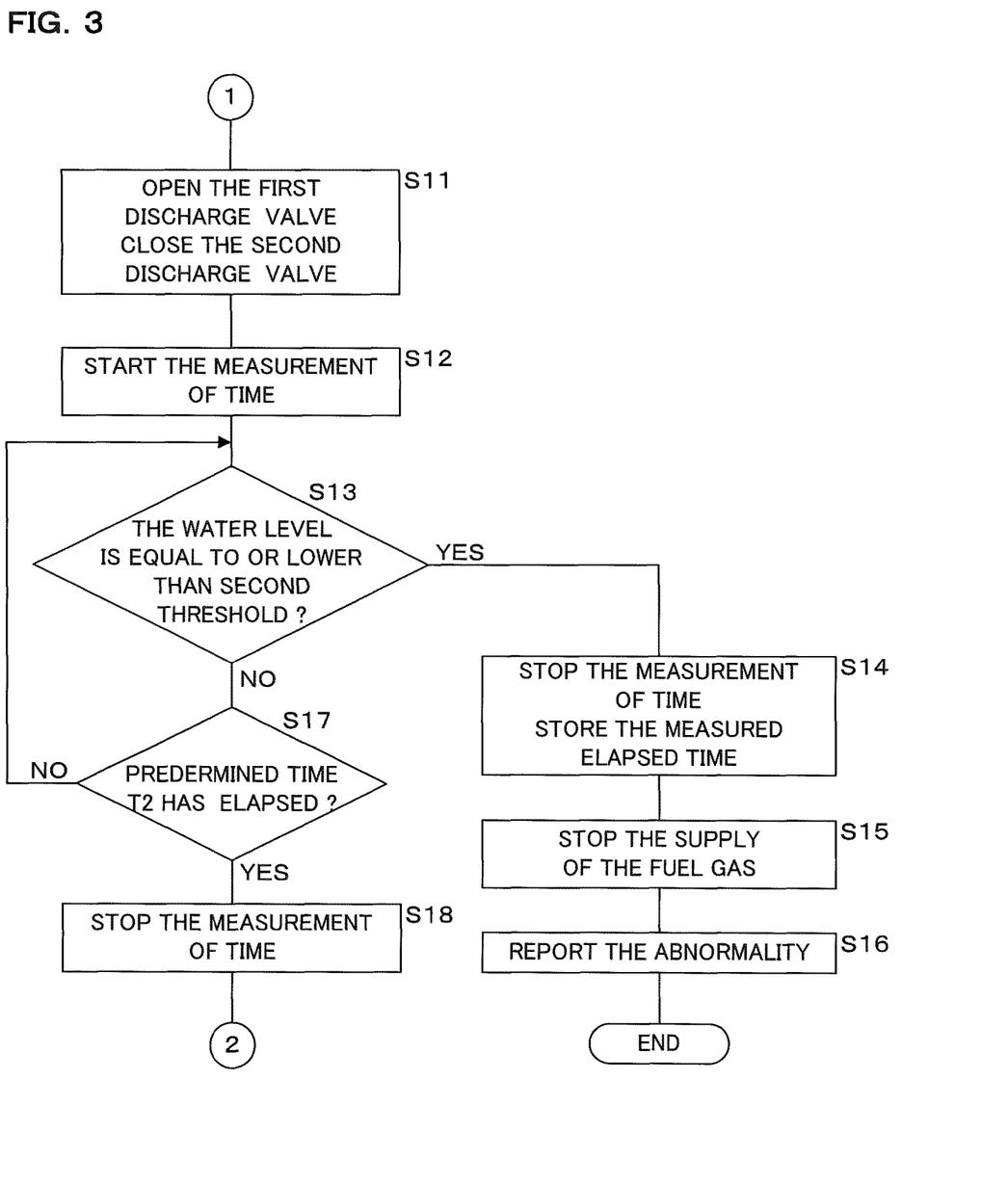
FIG. 3 is a flowchart illustrating the discharge valve abnormality determination procedure.
Figure 4:
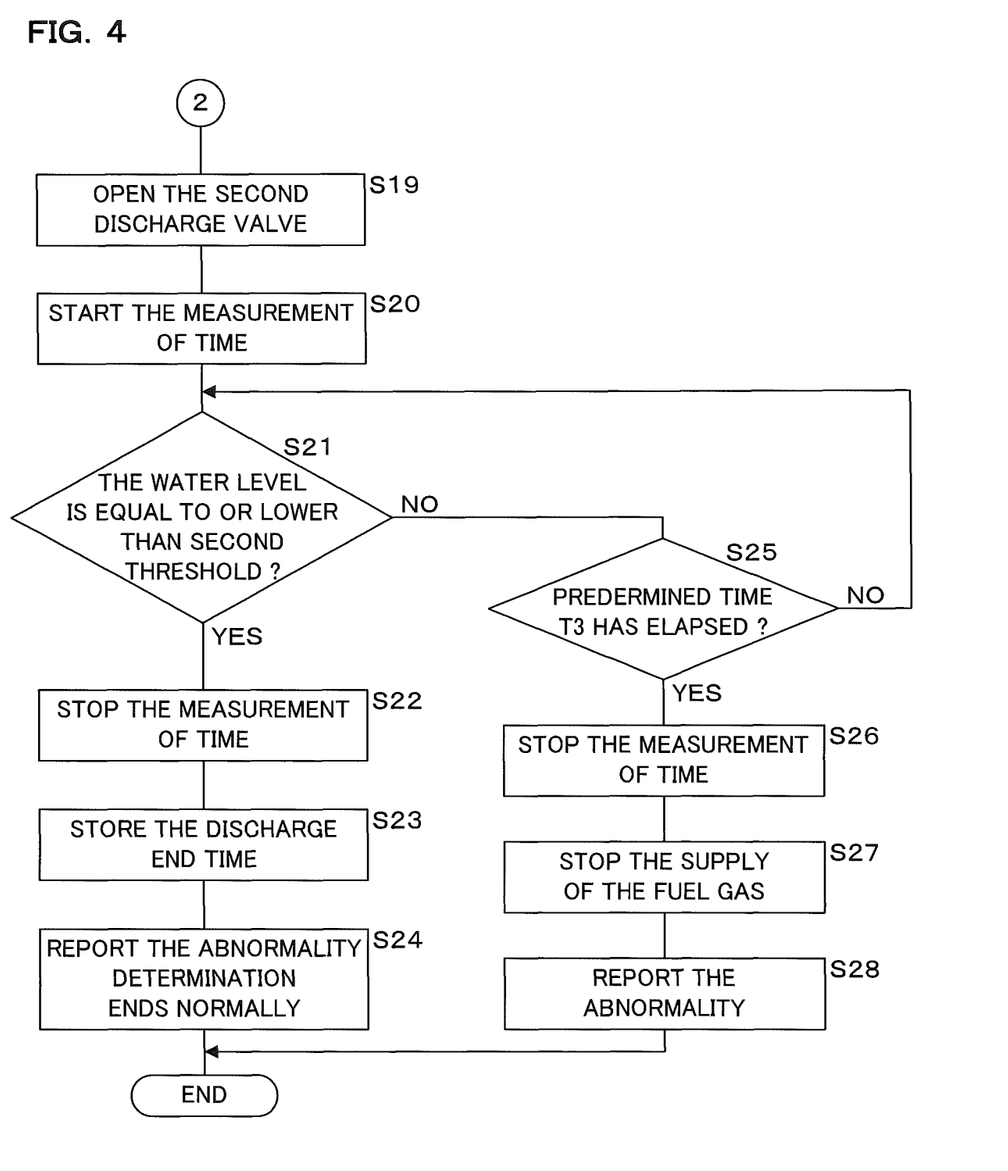
FIG. 4 is a flowchart illustrating the discharge valve abnormality determination procedure.

FIGS. 2, 3 and 4 represent a flowchart illustrating a discharge valve abnormality determination procedure. The control unit 50 periodically performs the following procedure in order to determine the abnormality of the first discharge valve 3 and the second discharge valve 4. The storage unit 51 stores a second threshold involved with the water level of the gas-liquid separator 2. The water level involved with the second threshold is lower than the water level involved with the first threshold. Further, the control unit 50 closes the first discharge valve 3 and the second discharge valve 4 before the following procedure.

The control unit 50 determines whether the water level detected by the water level sensor 20 is equal to or higher than the first threshold (S1). If the control unit 50 determines that the water level detected by the water level sensor 20 is not equal to or higher than the first threshold (S1: NO), the control unit 50 determines whether the accumulated power generation amount obtained from the time point at which the water and the gas inside the gas-liquid separator 2 are discharged is equal to or larger than a predetermined value A (S2). At this time, the control unit 50 calculates the accumulated power generation amount based on the elapsed time from the time checked by the clocking unit 53 at the time point to the determination time in step S2 and the predetermined power generation amount obtained in every predetermined time.

If the control unit 50 determines that the accumulated power generation amount obtained from the time point at which the water and the gas inside the gas-liquid separator 2 are discharged is not equal to or larger than the predetermined value A (S2: NO), the processing is returned to step S1. If the control unit 50 determines that the accumulated power generation amount obtained from the time point at which the water and the gas inside the gas-liquid separator 2 are discharged is equal to or larger than the predetermined value A (S2: YES), an instruction of stopping the supply of the fuel gas is output to the hydrogen supply unit 12 (S7), and the abnormality of the fuel cell 100 is output so that the reporting unit 6 reports the abnormality (S8). If the control unit 50 determines that the accumulated power generation amount is equal to or larger than the predetermined value A, a predetermined amount of water that is assumed to be stored inside the gas-liquid separator 2 is not stored therein. Thus, water leaks at both the first discharge valve 3 and the second discharge valve 4.

If, on the other hand, the control unit 50 determines that the water level detected by the water level sensor 20 is equal to or higher than the first threshold (S1: YES), the control unit 50 opens the second discharge valve 4 while closing the first discharge valve (S3). Further, the control unit 50 starts the measurement by the timer function of the clocking unit 53 (S4).

The control unit 50 determines whether the water level detected by the water level sensor 20 is equal to or lower than the second threshold (S5). If the control unit 50 determines that the water level detected by the water level sensor 20 is equal to or lower than the second threshold (S5: YES), the control unit 50 stops the measurement by the clocking unit 53 and stores the measured elapsed time in the storage unit 51 (S6). Subsequently, the control unit 50 stops the supply of the fuel gas from the hydrogen supply unit 12 (S7), and outputs the abnormality of the first discharge valve 3 so that the abnormality is reported by the reporting unit 6 (S8). At this time, water leaks at the first discharge valve 3.

If, on the other hand, the control unit 50 determines that the water level detected by the water level sensor 20 is not equal to or lower than the second threshold (S5: NO), it is determined whether a predetermined time T1 has elapsed (S9). The predetermined time T1 is set to satisfy the inequation of T1>X/Y1 on the assumption that the water amount corresponding to the difference between the first threshold and the second threshold according to the water level of the gas-liquid separator 2 is indicated by X and an allowed water leakage amount in the first discharge valve 3 is indicated by Y1. The allowed water leakage amount Y1 is set to, for example, a value per second. Thus, it is possible to determine the abnormality of the first discharge valve 3 in which water leaks by the allowed water leakage amount Y1 or more.

If the control unit 50 determines that the predetermined time T1 has not elapsed (S9: NO), the processing is returned to step S5. If, on the other hand, the control 50 unit determines that the predetermined time T1 has elapsed (S9: YES), the control unit 50 stops the measurement by the clocking unit 53 (S10).

Subsequently, the control unit 50 opens the first discharge valve 3 and closes the second discharge valve 4 (S11). Further, the control unit 50 starts the measurement by the timer function of the clocking unit 53 (S12).

The control unit 50 determines whether the water level detected by the water level sensor 20 is equal to or lower than the second threshold (S13). If the control unit 50 determines that the water level detected by the water level sensor 20 is equal to or lower than the second threshold (S13: YES), the control unit 50 stops the measurement by the clocking unit 53 and stores the measured elapsed time in the storage unit 51 (S14). Subsequently, the control unit 50 stops the supply of the fuel gas from the hydrogen supply unit 12 (S15), and outputs the abnormality of the second discharge valve 4 to report the abnormality by the reporting unit 6 (S16). At this time, water leaks at the second discharge valve 4.

If, on the other hand, the control unit 50 determines that the water level detected by the water level sensor 20 is not equal to or lower than the second threshold (S13: NO), it is determined whether a predetermined time T2 has elapsed (S17). The predetermined time T2 is set to satisfy the inequation of T2>X/Y2 on the assumption that an allowed water leakage amount in the second discharge valve 4 is indicated by Y2. The allowed water leakage amount Y2 is set to, for example, a value per second. Thus, it is possible to determine the abnormality of the second discharge valve 4 in which the water leakage amount is equal to or more than the allowed water leakage amount Y2. Further, the predetermined time T2 is set to satisfy the inequation of T2<T1. Thus, it is possible to determine the abnormality of the second discharge valve 4 in consideration of the minor leakage in the entire water discharge process.

If the control unit 50 determines that the predetermined time T2 has not elapsed (S17: NO), the processing is returned to step S13. If, on the other hand, the control unit 50 determines that the predetermined time T2 has elapsed (S17: YES), the control unit 50 stops the measurement by the clocking unit 53 (S18).

Subsequently, the control unit 50 opens the second discharge valve 4 (S19). Further, the control unit 50 starts the measurement by the timer function of the clocking unit 53 (S20).

The control unit 50 determines whether the water level detected by the water level sensor 20 is equal to or lower than the second threshold (S21). If the control unit 50 determines that the water level detected by the water level sensor 20 is equal to or lower than the second threshold (S21: YES), the control unit 50 stops the measurement by the clocking unit 53 (S22). Subsequently, the discharge of the gas and the water is stopped, and the discharge end time is stored in the storage unit 51 (S23). Subsequently, the control unit 50 reports a state where the first discharge valve 3 and the second discharge valve 4 are not abnormal and the abnormality determination ends normally by the reporting unit 6 (S24).

If, on the other hand, the control unit 50 determines that the water level detected by the water level sensor 20 is not equal to or lower than the second threshold (S21: NO), it is determined whether a predetermined time T3 has elapsed (S25). The predetermined time T3 is set to satisfy the equation of T3=X/Y3 on the assumption that the lowest amount of the water to be discharged from the first discharge valve 3 and the second discharge valve 4 in every predetermined time is indicated by Y3. The lowest water discharge amount Y3 is defined as, for example, a value per second. Thus, it is possible to determine the abnormality in which the amount of the water discharged from the first discharge valve 3 and the second discharge valve 4 is lower than the lowest water discharge amount.

If the control unit 50 determines that the predetermined time T3 has not elapsed (S25: NO), the processing is returned to step S21. If the control unit 50 determines that the predetermined time T3 has elapsed (S25: YES), the control unit 50 stops the measurement by the clocking unit 53 (S26). Subsequently, the control unit 50 stops the supply of the fuel gas from the hydrogen supply unit 12 (S27), and reports the abnormality of the first discharge valve 3 and the second discharge valve 4 by the reporting unit 6 (S28). Thus, the control unit 50 can determine that the abnormality is caused by a case where any one of or both the first discharge valve 3 and the second discharge valve 4 are not opened, a case where the amount of the gas stored in the gas-liquid separator 2 is small and the upstream pressure of the first discharge valve 3 is smaller than a supposed pressure, or a case where the water discharge line from the gas-liquid separator 2 is jammed.

According to the above-described configuration, since the abnormality of the first discharge valve 3 and the second discharge valve 4 is determined based on a change in the water level inside the gas-liquid separator 2, it is possible to determine the abnormality of the first discharge valve 3 and the second discharge valve 4 before the gas inside the gas-liquid separator 2 is discharged. Accordingly, it is possible to determine the abnormality of the first discharge valve 3 and the second discharge valve 4 without discharging the gas inside the gas-liquid separator 2.

The control unit 50 outputs the abnormality if the water level becomes equal to or lower than the second threshold while the first discharge valve 3 is closed and the second discharge valve 4 is opened, and reports the abnormality by the reporting unit 6. Further, if the water level becomes equal to or lower than the second threshold, water leaks at the first discharge valve 3. Accordingly, the control unit 50 can determine the abnormality involved with the closing of the first discharge valve 3, and hence a user of the fuel cell 100 can recognize the abnormality.

If the water level becomes equal to or lower than the second threshold while the first discharge valve 3 is opened and the second discharge valve 4 is closed, an abnormality is output and is reported by the reporting unit 6. Further, if the water level becomes equal to or lower than the second threshold, water leaks at the second discharge valve 4. Accordingly, the control unit 50 can determine the abnormality involved with the closing of the second discharge valve 4, and hence the user of the fuel cell 100 can recognize the abnormality.

Since the control unit 50 measures a time necessary from a time point at which the first discharge valve 3 is closed and the second discharge valve 4 is opened to a time point at which the water level becomes equal to or lower than the second threshold by the clocking unit 53 and stores the measured time in the storage unit 51, the leakage degree of the discharge valve can be calculated from the decreased amount of the water level and the time. Further, same applies to the case where the first discharge valve 3 is opened and the second discharge valve 4 is closed.

If the water level does not increase to the first threshold from the time point at which the gas and the water are discharged, the control unit 50 determines whether the abnormality occurs depending on whether the accumulated power generation amount for a predetermined time elapsed from the time measured by the clocking unit 53 at the time point is equal to or larger than the predetermined value A, and reports the abnormality by the reporting unit 6. If the water level does not increase to the first threshold, water leaks at both the first discharge valve 3 and the second discharge valve 4 although the water is produced by the generation of electric power, and hence the water is not stored inside the gas-liquid separator 2. Accordingly, the control unit 50 can determine the abnormality involved with the closing of both the first discharge valve 3 and the second discharge valve 4, and hence the user of the fuel cell 100 can recognize the abnormality. Further, it is possible to determine the abnormality of the discharge valve without discharging the gas inside the gas-liquid separator by opening the discharge valve.

(Embodiment 2)

Figure 5:
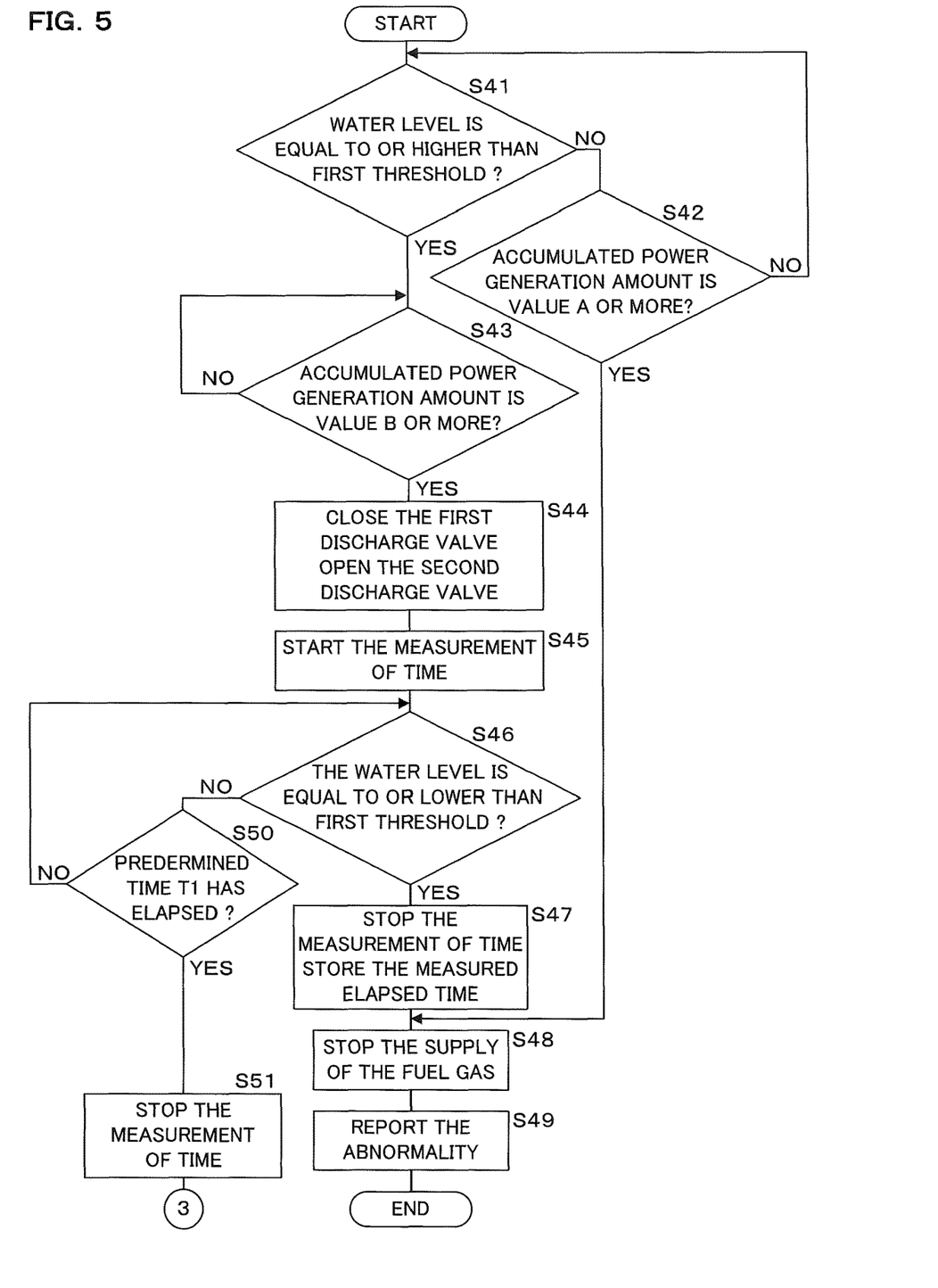
FIG. 5 is a flowchart illustrating a discharge valve abnormality determination procedure of a fuel cell according to Embodiment 2.
Figure 6:
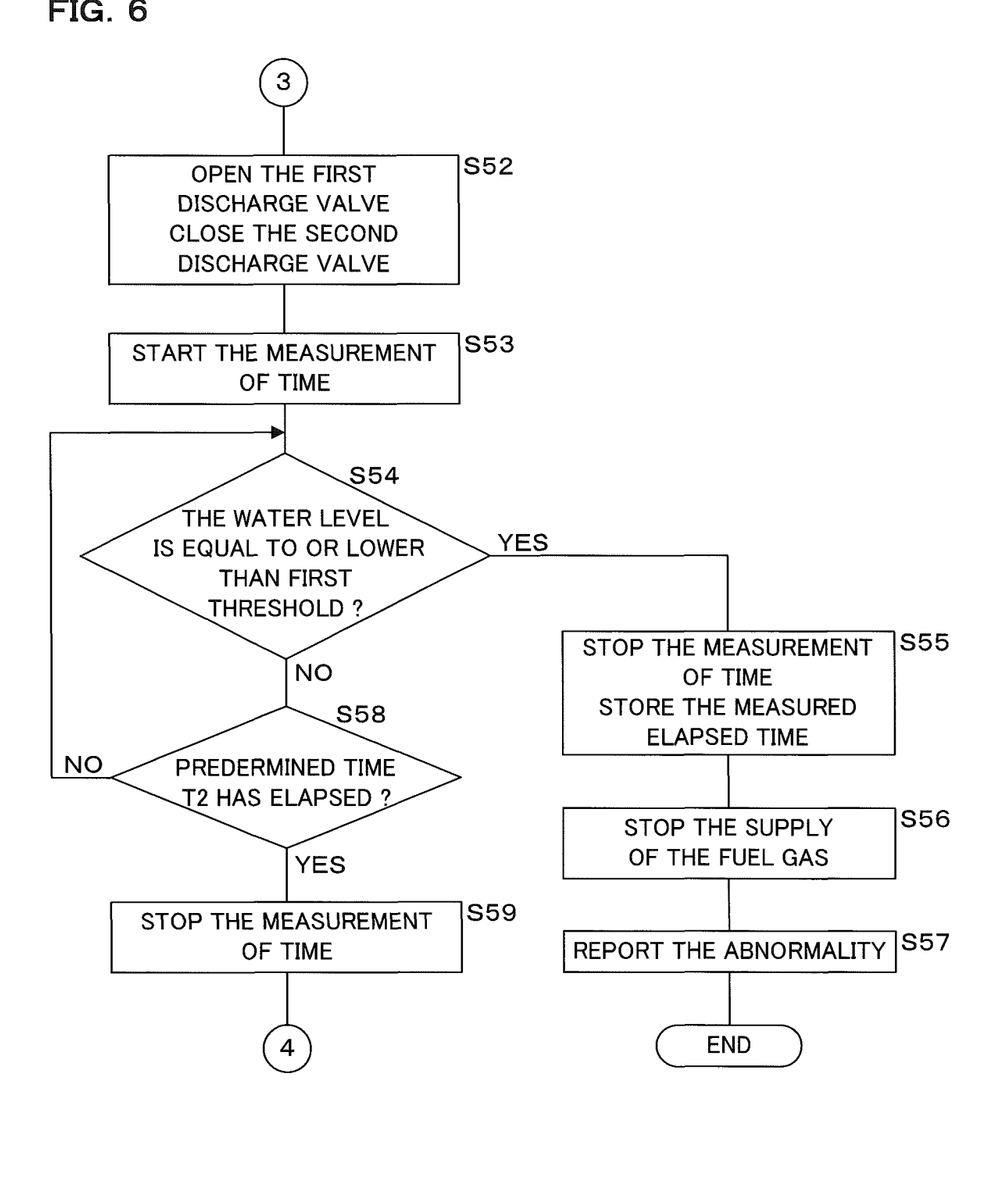
FIG. 6 is a flowchart illustrating the discharge valve abnormality determination procedure of the fuel cell according to Embodiment 2.
Figure 7:
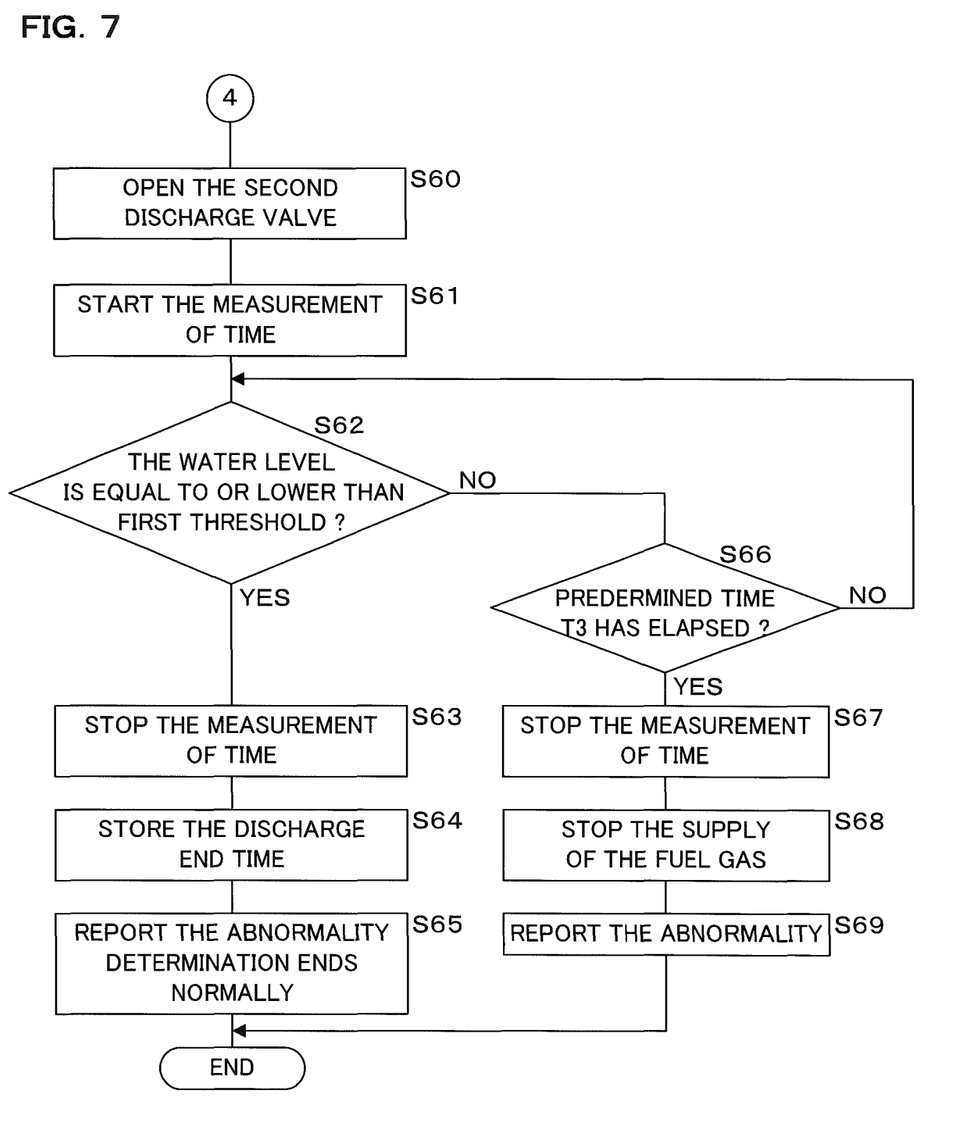
FIG. 7 is a flowchart illustrating the discharge valve abnormality determination procedure of the fuel cell according to Embodiment 2.

FIGS. 5, 6 and 7 represent a flowchart illustrating a discharge valve abnormality determination procedure of the fuel cell 100 according to Embodiment 2. In the configuration of the fuel cell 100 according to Embodiment 2, the same component as Embodiment 1 will be indicated by the same reference numeral, and the detailed description thereof will not be described.

The control unit 50 periodically performs the following procedure in order to determine the abnormality of the first discharge valve 3 and the second discharge valve 4. The storage unit 51 stores the first threshold involved with the water level of the gas-liquid separator 2. The control unit 50 closes the first discharge valve 3 and the second discharge valve 4 before the following procedure.

The control unit 50 determines whether the water level detected by the water level sensor 20 is equal to or higher than the first threshold (S41). If the control unit 50 determines that the water level detected by the water level sensor 20 is not equal to or higher than the first threshold (S41: NO), the control unit 50 determines whether the accumulated power generation amount obtained from the time point at which the water and the gas inside the gas-liquid separator 2 are discharged is equal to or larger than the predetermined value A (S42). The accumulated power generation amount in step S42 is calculated by a method similar to that in Embodiment 1.

If the control unit 50 determines that the accumulated power generation amount obtained from the time point at which the water and the gas inside the gas-liquid separator 2 are discharged is not equal to or larger than the predetermined value A (S42: NO), the processing is returned to step S41. If the control unit 50 determines that the accumulated power generation amount obtained from the time point at which the water and the gas inside the gas-liquid separator 2 are discharged is equal to or larger than the predetermined value A (S42: YES), an instruction of stopping the supply of the fuel gas is output to the hydrogen supply unit 12 (S48), and the abnormality of the fuel cell 100 is output so that the abnormality is reported by the reporting unit 6 (S49). If the control unit 50 determines that the accumulated power generation amount is equal to or larger than the predetermined value A, a predetermined amount of water that is assumed to be stored inside the gas-liquid separator 2 is not stored therein, and hence water leaks at both the first discharge valve 3 and the second discharge valve 4.

If, on the other hand, the control unit 50 determines that the water level detected by the water level sensor 20 is equal to or higher than the first threshold (S41: YES), the control unit 50 determines whether the accumulated power generation amount obtained from the time point at which the water level is determined to be the first threshold or higher is equal to or larger than the predetermined value B (S43). At this time, the control unit 50 calculates the accumulated power generation amount based on the elapsed time from the time at which the water level is determined to be equal to or higher than the first threshold to the time of the determination in step S43 and the predetermined power generation amount in every predetermined time. In addition, an inequation of predetermined value A>B is satisfied.

When the control unit 50 determines that the accumulated power generation amount obtained from the time point at which the water level is determined to be the first threshold or higher is not equal to or larger than the predetermined value B (S43: NO), the processing is returned to step S43. If the control unit 50 determines that the accumulated power generation amount is equal to or larger than the predetermined value B (S43: YES), the second discharge valve 4 is opened while the first discharge valve 3 is closed (S44). Further, the control unit 50 starts the measurement by the timer function of the clocking unit 53 (S45).

The control unit 50 determines whether the water level detected by the water level sensor 20 is equal to or lower than the first threshold (S46). If the control unit 50 determines that the water level detected by the water level sensor 20 is equal to or lower than the first threshold (S46: YES), the control unit 50 stops the measurement by the clocking unit 53 and stores the measured elapsed time in the storage unit 51 (S47). Subsequently, the control unit 50 stops the supply of the fuel gas from the hydrogen supply unit 12 (S48), and outputs the abnormality of the first discharge valve 3 to report the abnormality by the reporting unit 6 (S49). At this time, water leaks at the first discharge valve 3.

If, on the other hand, the control unit 50 determines that the water level detected by the water level sensor 20 is not equal to or lower than the first threshold (S46: NO), the control unit 50 determines whether the predetermined time T1 has elapsed (S50). The predetermined time T1 is set similarly to the case in Embodiment 1.

If the control unit 50 determines that the predetermined time T1 has not elapsed (S50: NO), the processing is returned to step S46. If, on the other hand, the control unit 50 determines that the predetermined time T1 has elapsed (S50: YES), the control unit 50 stops the measurement by the clocking unit 53 (S51).

Subsequently, the control unit 50 opens the first discharge valve 3 and closes the second discharge valve 4 (S52). Further, the control unit 50 starts the measurement by the timer function of the clocking unit 53 (S53).

The control unit 50 determines whether the water level detected by the water level sensor 20 is equal to or lower than the first threshold (S54). If the control unit 50 determines that the water level detected by the water level sensor 20 is equal to or lower than the first threshold (S54: YES), the control unit 50 stops the measurement by the clocking unit 53, and stores the measured elapsed time in the storage unit 51 (S55). Subsequently, the control unit 50 stops the supply of fuel gas from the hydrogen supply unit 12 (S56), and outputs the abnormality of the second discharge valve 4 so as to report the abnormality by the reporting unit 6 (S57). At this time, water leaks at the second discharge valve 4.

If, on the other hand, the control unit 50 determines that the water level detected by the water level sensor 20 is not equal to or lower than the first threshold (S54: NO), the control unit 50 determines whether the predetermined time T2 has elapsed (S58). The predetermined time T2 is set similarly to Embodiment 1.

If the control unit 50 determines that the predetermined time T2 has not elapsed (S58: NO), the processing is returned to step S54. If, on the other hand, the control unit 50 determines that the predetermined time T2 has elapsed (S58: YES), the control unit 50 stops the measurement by the clocking unit 53 (S59).

Subsequently, the control unit 50 opens the second discharge valve 4 (S60). Further, the control unit 50 starts the measurement by the timer function of the clocking unit 53 (S61).

The control unit 50 determines whether the water level detected by the water level sensor 20 is equal to or lower than the first threshold (S62). If the control unit 50 determines that the water level detected by the water level sensor 20 is equal to or lower than the first threshold (S62: YES), the control unit 50 stops the measurement by the clocking unit 53 (S63). Subsequently, the discharge of the gas and the water is stopped, and the discharge end time is stored in the storage unit 51 (S64). Subsequently, the control unit 50 reports that the first discharge valve 3 and the second discharge valve 4 are not abnormal and the abnormality determination ends normally by the reporting unit 6 (S65).

If, on the other hand, the control unit 50 determines that the water level detected by the water level sensor 20 is not equal to or lower than the first threshold (S62: NO), the control unit 50 determines whether the predetermined time T3 has elapsed (S66). The predetermined time T3 is set similarly to Embodiment 1.

If the control unit 50 determines that the predetermined time T3 has not elapsed (S66: NO), the processing is returned to step S62. If the control unit 50 determines that the predetermined time T3 has elapsed (S66: YES), the control unit 50 stops the measurement by the clocking unit 53 (S67). Subsequently, the control unit 50 stops the supply of the fuel gas from the hydrogen supply unit 12 (S68), and reports the abnormality of the first discharge valve 3 and the second discharge valve 4 by the reporting unit 6 (S69). Thus, the control unit 50 can determine that the abnormality is caused by a case where any one of or both the first discharge valve 3 and the second discharge valve 4 are not opened, a case where the amount of the gas stored in the gas-liquid separator 2 is small and the upstream pressure of the first discharge valve 3 is smaller than a supposed pressure, or a case where the water discharge line from the gas-liquid separator 2 is jammed.

According to the above-described configuration, it is possible to determine the abnormality of the first discharge valve 3 and the second discharge valve 4 before the gas inside the gas-liquid separator 2 is discharged similarly to Embodiment 1. Accordingly, it is possible to determine the abnormality of the first discharge valve 3 and the second discharge valve 4 without discharging the gas inside the gas-liquid separator 2.

Similarly to Embodiment 1, the control unit 50 outputs the abnormality if the water level becomes equal to or lower than the first threshold while the first discharge valve 3 is closed and the second discharge valve 4 is opened, and reports the abnormality by the reporting unit 6. Further, if the water level becomes equal to or lower than the first threshold, water leaks at the first discharge valve 3. Accordingly, the control unit 50 can determine the abnormality involved with the closing of the first discharge valve 3, and hence a user of the fuel cell 100 can recognize the abnormality.

Further, if the water level becomes equal to or lower than the first threshold while the first discharge valve 3 is opened and the second discharge valve 4 is closed, the control unit 50 outputs an abnormality and reports the abnormality by the reporting unit 6. Further, if the water level becomes equal to or lower than the first threshold, water leaks at the second discharge valve 4. Accordingly, the control unit 50 can determined the abnormality involved with the closing of the second discharge valve 4, and hence the user of the fuel cell 100 can recognize the abnormality.

Since the control unit 50 measures a time necessary from a time point at which the first discharge valve 3 is closed and the second discharge valve 4 is opened to a time point at which the water level becomes equal to or lower than the first threshold by the clocking unit 53 and stores the measured time in the storage unit 51, the leakage degree of the discharge valve can be calculated from the decreased amount of the water level and the time. Further, same applies to the case where the first discharge valve 3 is opened and the second discharge valve 4 is closed.

If the water level does not increase to the first threshold from the time point at which the gas and the water are discharged, the control unit 50 determines whether an abnormality occurs depending on whether the accumulated power generation amount for a predetermined time elapsed from the time measured by the clocking unit 53 at the above-described time point is equal to or larger than the predetermined value A, and reports the abnormality by the reporting unit 6. If the water level does not increase to the first threshold, water leaks at both the first discharge valve 3 and the second discharge valve 4 although the water is produced by the generation of electric power, and hence the water is not stored inside the gas-liquid separator 2. Accordingly, the control unit 50 can determine the abnormality involved with the closing of both the first discharge valve 3 and the second discharge valve 4, and hence the user of the fuel cell 100 can recognize the abnormality. Further, it is possible to determine the abnormality of the discharge valve without discharging the gas inside the gas-liquid separator by opening the discharge valve.

Differently from Embodiment 1, if the control unit 50 determines that the water level becomes equal to or higher than the first threshold, the control unit 50 determines whether the accumulated power generation amount is equal to or larger than the predetermined value B, and then determines the abnormality of the first discharge valve 3 and the second discharge valve 4. Thus, it is possible to determine the abnormality of the first discharge valve 3 and the second discharge valve 4 similarly to Embodiment 1 by using only the first threshold without using the second threshold involved with the water level. Further, since the abnormality of the first discharge valve 3 and the second discharge valve 4 is determined only by the first threshold, the abnormality determination configuration can be simplified.

In addition, in the fuel cell 100, the abnormality of the first discharge valve 3 is determined and then the abnormality of the second discharge valve 4 is determined, but the abnormality of the first discharge valve 3 may be determined after determining the abnormality of the second discharge valve 4. Further, the fuel cell 100 may include only either one of the first discharge valve 3 and the second discharge valve 4.

Furthermore, the fuel cell 100 includes two discharge valves, that is, the first discharge valve 3 and the second discharge valve 4, while three or more discharge valves may alternatively be connected to the gas-liquid separator 2 in series. Even when three or more discharge valves are provided, the abnormality may be determined by repeating an operation in which one discharge valve is closed and another discharge valve is opened for each of the discharge valves.

As described above, according to one aspect of the example embodiment, the fuel cell includes a gas-liquid separator separately storing gas and water; a discharge valve discharging the gas and the water; a control unit controlling the operation of the discharge valve; and a detector detecting a water level of the gas-liquid separator. The control unit is configured to determine an abnormality of the discharge valve based on a change in the water level caused by opening and closing of the discharge valve if the water level detected by the detector is equal to or higher than a first threshold.

According to the example embodiment, since the control unit determines the abnormality of the discharge valve based on a change in the water level inside the gas-liquid separator, it is possible to determine the abnormality of the discharge valve before gas is discharged. Accordingly, the control unit can determine the abnormality of the discharge valve without discharging the gas inside the gas-liquid separator.

In the fuel cell according to the example embodiment, a plurality of the discharge valves are disposed in series, the control unit closes one discharge valve and opens another discharge valve, and if the water level detected by the detector is equal to or lower than the second threshold corresponding to a value of the first threshold or less, a signal representing an abnormality of the one discharge valve is output.

According to the example embodiment, the control unit outputs an abnormality if the water level becomes equal to or lower than the second threshold while one discharge valve is closed and another discharge valve is opened. If the water level becomes equal to or lower than the second threshold, water leaks at one discharge valve. Accordingly, the control unit can determine the abnormality involved with the closing of one discharge valve.

In the fuel cell according to the example embodiment, the control unit opens the one discharge valve and closes said another discharge valve, and if the water level detected by the detector is equal to or lower than the second threshold, a signal representing an abnormality of said another discharge valve is output.

According to the example embodiment, the control unit outputs the abnormality if the water level becomes equal to or lower than the second threshold while one discharge valve is opened and another discharege valve is closed. If the water level becomes equal to or lower than the second threshold, water leaks at another discharge valve. Accordingly, the control unit can determine the abnormality involved with the closing of another discharge valve.

The fuel cell according to the example embodiment, further comprises: a clocking unit measuring an elapsed time from a time point when the control unit closes one discharge valve and opens another discharge valve to a time point when the detector detects the water level equal to or lower than the second threshold; and a storage unit storing the elapsed time.

According to the example embodiment, since the clocking unit measures a time necessary from a time point at which one discharge valve is closed and another discharge valve is opened to a time point at which the water level becomes equal to or lower than the second threshold and the storage unit stores the time, the leakage degree of the discharge valve can be calculated from the decreased amount of the water level and the time.

According to one aspect of the example embodiment, the fuel cell includes a gas-liquid separator separately storing gas and water; a plurality of discharge valves discharging the gas and the water; a control unit controlling the operation of the discharge valves; a detector detecting a water level of the gas-liquid separator; and a clocking unit measuring an elapsed time from a time point when the gas and the water are discharged. The control unit is configured to determine an abnormality of the discharge valves if the detector detects a water level of a threshold or less after the clocking unit measures a predetermined time.

According to the example embodiment, the abnormality is determined if the water level does not increase to the threshold within a predetermined time from a time point at which the gas and the water are discharged. If the water level does not increase to the threshold, a predetermined amount of water that is assumed to be stored inside the gas-liquid separator is not stored therein although water is produced by the generation of electric power, and hence water leaks at the plurality of discharge valves. Accordingly, since the control unit determines the abnormality involved with the closing of the plurality of discharge valves, it is possible to determine the abnormality of the discharge valves without discharging the gas inside the gas-liquid separator by opening the discharge valve.

According to one aspect of the example embodiment, the abnormality determination method for determining an abnormality of a discharge valve of a fuel cell including a gas-liquid separator separately storing gas and water, a detector detecting a water level of the gas-liquid separator, a plurality of discharge valves disposed in series to discharge the gas and the water, and a control unit controlling operations of the discharge valves, comprises: determining whether the water level detected by the detector is equal to or higher than a threshold; and determining an abnormality of the discharge valves based on a change in the water level caused by an operation where the control unit opens and closes the discharge valves if determining the water level detected by the detector is equal to or higher than the threshold.

According to the example embodiment, since the abnormality of the discharge valve is determined based on a change in the water level inside the gas-liquid separator, it is possible to determine the abnormality of the discharge valve before gas is discharged. Accordingly, it is possible to determine the abnormality of the discharge valve without discharging the gas inside the gas-liquid separator.

It should be understood that the embodiments disclosed herein are illustrative and non-restrictive in every respect. Since the scope of the present invention is defined by the appended claims rather than by the description preceding them, and all changes that fall within metes and bounds of the claims, or equivalence of such metes and bounds thereof are therefore intended to be embraced by the claims. That is, embodiments obtained by combining technical means appropriately modified within the scope defined by the appended claims are also included in the technical scope of the present invention.

It is noted that, as used herein and in the appended claims, the singular forms "a", "an", and "the" include plural referents unless the context clearly dictates otherwise.

What is claimed is:

1. A fuel cell, comprising:
    a gas-liquid separator separately storing gas and water;
    a plurality of discharge valves which are disposed in series and discharge the gas and the water;
    a control unit controlling the operation of the discharge valve; and
    a detector detecting a water level of the gas-liquid separator,
    wherein the control unit is configured to open another discharge valve, if at least one of the discharge valves is in a closed state and the water level detected by the detector is equal to or higher than a first threshold; and
    the control unit is also configured to determine an abnormality of the discharge valve in a closed state before the gas inside the gas-liquid separator is charged, if the control unit determines that the water level detected by the detector after a predetermined time elapses is equal to or lower than a second threshold which is smaller than the first threshold.

2. The fuel cell according to claim 1, wherein
if the water level detected by the detector is equal to or lower than a second threshold, a signal representing an abnormality of the one discharge valve is output.

3. The fuel cell according to claim 2, wherein
the control unit opens the one discharge valve and closes said another discharge valve, and
if the water level detected by the detector is equal to or lower than the second threshold, a signal representing an abnormality of said another discharge valve is output.

4. The fuel cell according to claim 2, further comprising:
a clocking unit measuring an elapsed time from a time point when the control unit opens another discharge valve to a time point when the detector detects the water level equal to or lower than the second threshold; and
a storage unit storing the elapsed time.

5. The fuel cell according to claim 3, further comprising:
a clocking unit measuring an elapsed time from a time point when the control unit closes one discharge valve and opens another discharge valve to a time point when the detector detects the water level equal to or lower than the second threshold; and
a storage unit storing the elapsed time.

* * * * *